Nov. 6, 1945.  J. R. MACINTYRE  2,388,559
TOTALIZING LIQUID LEVEL INDICATOR
Filed Aug. 28, 1944  2 Sheets-Sheet 1
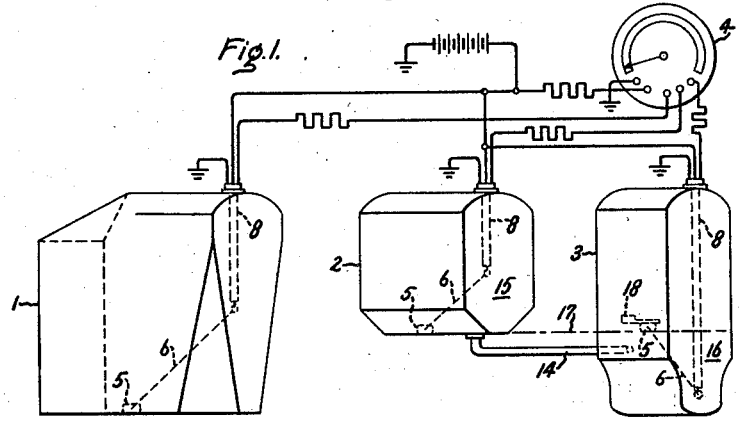
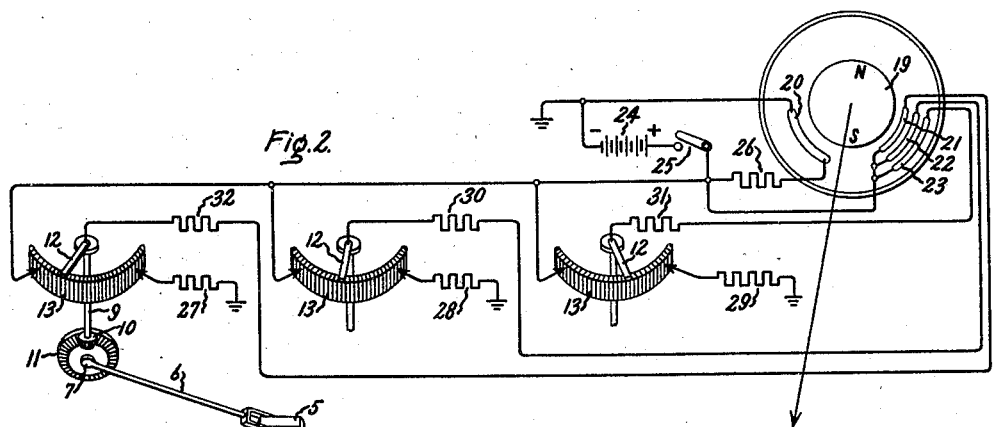
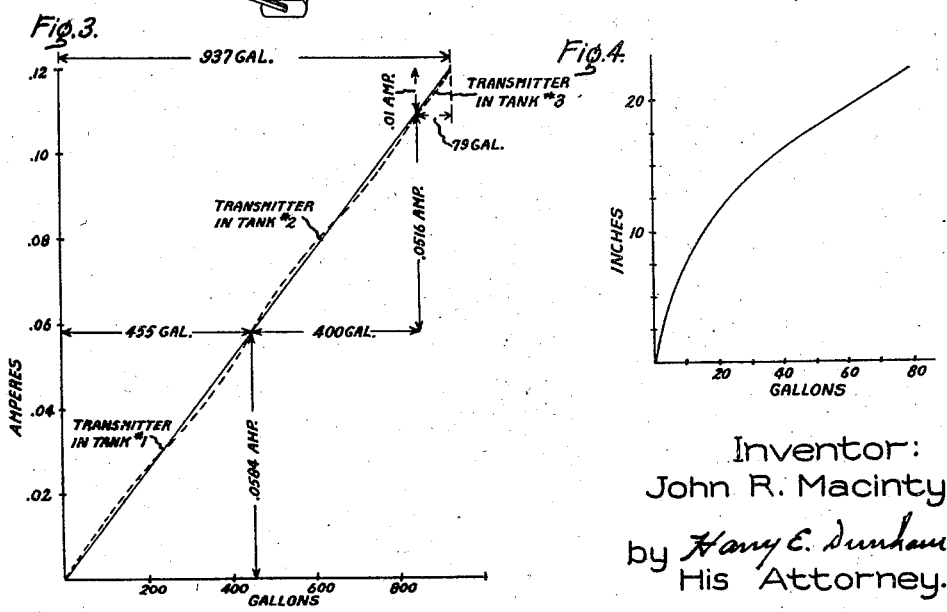
Inventor:
John R. Macintyre,
by Harry E. Dunham
His Attorney.

Nov. 6, 1945.     J. R. MACINTYRE     2,388,559
TOTALIZING LIQUID LEVEL INDICATOR
Filed Aug. 28, 1944     2 Sheets-Sheet 2

Inventor:
John R. Macintyre,
by Harry E. Dunham
His Attorney.

Patented Nov. 6, 1945

2,388,559

UNITED STATES PATENT OFFICE 2,388,559

TOTALIZING LIQUID LEVEL INDICATOR

John R. Macintyre, South Peabody, Mass., assignor to General Electric Company, a corporation of New York Application August 28, 1944, Serial No. 551,606

3 Claims. (Cl. 73—313)

My invention relates to the totalizing measurement of the liquid contents of a plurality of tanks and finds application on aircraft for indicating on a single instrument the total amount of liquid in a plurality of tanks. The tanks in question may be of different capacity, different shape and at different levels, and the order in which liquid is drawn off or supplied to the various tanks may vary from time to time. The present invention relates to a system for the total liquid measurement in such tanks which is generally applicable to any number and combination of tanks and conditions such as mentioned above, the total liquid measurement being indicated on a single instrument and the system using conventional liquid level measuring apparatus.

Figure 5:
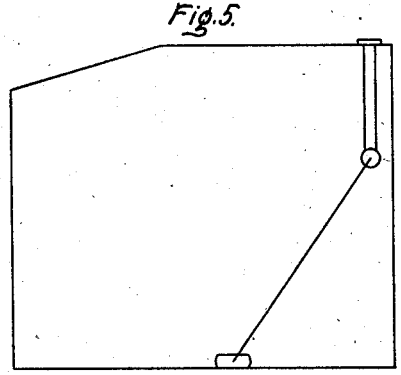
Figure 6:
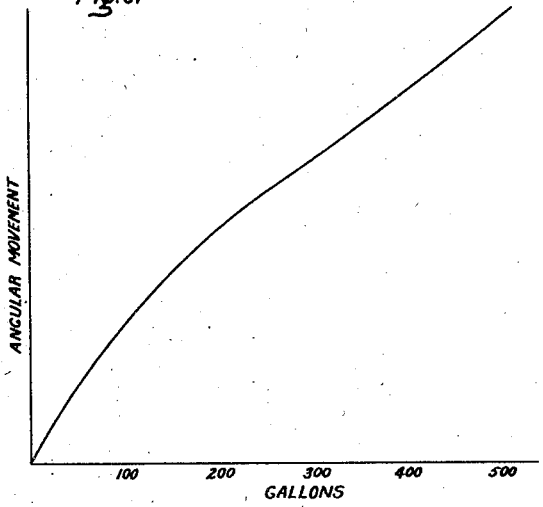
Figure 7:
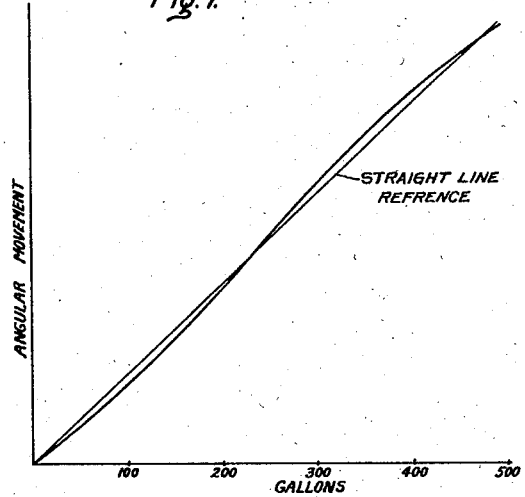
Figure 8:
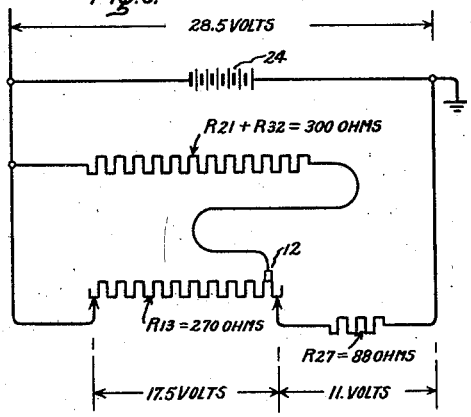
Figure 9:
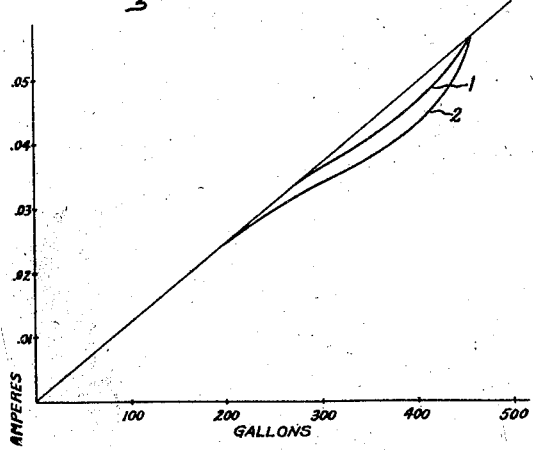
Figure 10:
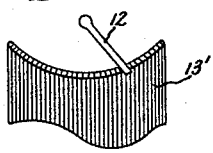

The features of my invention which are believed to be novel and patentable will be pointed out in the claims appended hereto. For a better understanding of my invention reference is made in the following description to the accompanying drawings in which Fig. 1 represents a three-tank summation system the relative size and shape of the tanks shown serving as an example to which the application of my invention will be explained. Fig. 2 shows a more detailed view of the electrical circuits used for the system of Fig. 1. Fig. 3 shows in full lines theoretically correct transmitter current-gallons curves for the three transmitters of Fig. 1 and in dotted lines superimposed on the straight lines, actual transmitter current-gallons curves as derived by my invention as hereinafter explained for the corresponding transmitters of Fig. 1. Fig. 4 represents the nature of the inches-gallons curve for the lower portion of tank 3 of Fig. 1. Fig. 5 shows an undesirable transmitter arrangement for tank 1 of Fig. 1, and Fig. 6 shows the resulting angular movement-gallons curve for such transmitter as arranged in Fig. 5. Fig. 7 shows the angular movement-gallons curve for a more satisfactory arrangement of the transmitter for tank 1 such as indicated in Fig. 1. Fig. 8 represents the resistance elements in the circuit of the transmitter for tank 1, Fig. 1. Fig. 9 shows current-gallons curves that could be obtained for the transmitter of tank 1 by using, in the example given, undesirable values of coil and other circuit resistances, and Fig. 10 shows an example of a transmitter which has a variable relation between resistance change and angular adjustment which can be employed.

In Fig. 1 I have represented three fuel tanks 1, 2 and 3. The tanks are of different shape and of different capacity and at different levels as is often necessary on aeroplanes because of the limited space requirements. The liquid contents of the several tanks may be measured on separate instruments, but it is very desirable that the total fuel in all of the tanks be indicated on a single instrument. Because of loading requirements it is also desirable that there shall be no restriction as to the order in which the tanks are filled or emptied. In accordance with my invention the total liquid content of the several tanks is indicated on a single instrument 4 employing conventional liquid level telemetering apparatus combined and calibrated in accordance with principles to be explained. The invention is not limited in its application to the number, shape, size and arrangement of tanks represented in Fig. 1 but is of general application.

The general form of transmitter employed is of the well-known float type represented at the left in Fig. 2 and consists of a float 5 on an arm 6 pivoted at 7 so as to permit the float to rise and fall with the liquid. The pivot point 7 is supported at a selected position in the tank generally by hollow piping 8 extending downward into the tank from the top as indicated in dotted lines in Fig. 1. Such piping supports a rotatable shaft 9 therein having a pinion 10 at its lower end engaging a gear 11 turned by the float arm 6 as it rises and falls. The upper end of the shaft 9 carries a contact arm 12 which moves over a transmitter resistance 13 to vary the current in a direct current telemetering circuit. The transmitter thus constituted is suitably housed and sealed from the liquid in the tank but these details form no part of the present invention.

It will be noted that the form of transmitter described is not very suitable for the tall narrow tank 3 if a single transmitter be used therein. To overcome this difficulty tanks 2 and 3 may be connected together by a pipe 14 leading from the bottom of the higher tank 2 into the lower portion of tank 3 at any point not higher than the bottom of tank 2. Such connection may be present for other reasons. Hence tank 2 and that part of tank 3 above the level of the bottom of tank 2 may be considered as a single tank for the purpose of liquid level measurement therein and the float type transmitter 15 for tank 2 and such upper portion of tank 3 is placed in tank 2 where there is room for the float lever action, although if room were available it could be placed in either of such tanks. At 16 is another float transmitter for measuring the liquid level in the lower portion of tank 3, and its float arm is provided with a stop 18 if necessary to prevent it rising above the level of the liquid measured by transmitter 15. This level is indicated by dotted line 17. Thus there is a transmitter in each tank all of similar design, the transmitter in tank 1 measuring the liquid in such tank, the transmitter 15 in tank 2 measuring the liquid therein and also that contained in the upper portion of tank 3 and the transmitter 16 in tank 3 measuring the liquid in the lower portion of such tank. For measurement purposes no particular relation needs to exist as to the comparative levels of tank 1 and tanks 2 and 3, or for that matter between the upper and lower measurement parts of tank 3.

The totalizing receiver 4 is a direct current ratio instrument and may comprise a polarized armature 19 under the influence of two fields at an angle of the order of 140 degrees to each other, one field produced by a stationary coil 20 in which, after calibration, a substantially constant current flows and the other field produced by one or more of three coaxial coils 21, 22 and 23 respectively connected to the transmitters in tanks 1, 2 and 3. The currents in coils 21, 22 and 23 vary with the positions of their respective float transmitters the currents increasing with rise in liquid level. The coaxial coils produce flux in the same direction and it will be assumed produce a north pole field adjacent the armature. Coil 20 will also produce a north pole field adjacent the armature. Hence the south pole of the armature is attracted and turned in response to the ratio resultant of the two fields, and the indication produced is a measure of such ratio. The armature represented in Fig. 2 indicates that the field produced by coil 20 is somewhat stronger than that being produced by coils 21, 22 and 23. To insure uniformity of positioning of the sections 21, 22, and 23, it is preferable that all of the sections be wound together in a single operation keeping the several wires as close together as possible, each of these coils then having the same number of turns. However, the invention is not restricted to the same number of turns and each section may be wound with a different number of turns if necessary. The structural details of this instrument are otherwise not concerned with the present invention. In general a well damped instrument having a shielded magnetic circuit and without any return spring will be suitable. The telemetering circuits and instruments are supplied from a direct current source 24 and become active upon the closing of a switch 25. Coil 20 is connected across source 24 through a resistance 26. The potentiometer resistances of the transmitters are connected across source 24 in series with corresponding calibrating resistances 27, 28 and 29. The receiver coils 21, 22 and 23 are shunted across portions of their corresponding potentiometer resistances, which portions vary with the position of the corresponding float 5 and adjustable contact arm 12. It is seen that as the float 5, Fig. 2, rises arm 12 moves to the right to increase the current in coil 21.

In order for the system to accurately indicate the total liquid contents of the several tanks of different shape and capacity regardless of the sequence in which they may be filled or emptied the increment of flux and ampere turns per gallon of fluid associated with each of the coils 21, 22 and 23 must be constant and of the same value for all tanks. The total ampere turns produced by the coils 21, 22 and 23 can then be represented by the equation $NI = ni(g_1 + g_2 + g_3)$ where $NI$ is the total ampere turns produced by the variable coils 21, 22 and 23, $ni$ the increment of ampere turns per gallon and $g_1$, $g_2$, and $g_3$ are the gallons measured by the transmitters in tanks 1, 2 and 3, respectively, bearing in mind in the case being described that the transmitter in tank 2 measures the liquid in such tank and also in the upper portion of tank 3 while the transmitter in tank 3 measures the liquid in the lower portion only of tank 3. Let it be assumed that tank 1 holds 455 gallons, tank 2 in combination with the upper selected portion of tank 3 holds 400 gallons, and the selected lower portion of tank 3 holds 79 gallons.

Considering the receiver instrument 4 let it be assumed that the instrument 4 requires the sum of 30 ampere turns in the coils 21, 22 and 23 for full scale deflection corresponding to the total gallons to be measured.

$$455 + 400 + 79 = 934 \text{ gallons}$$

Then the maximum ampere turns for each coil must be as follows: for coil 21 corresponding to the 445 gallon tank 1, $$\frac{455}{934} \times 30 = 14.6 \text{ ampere turns}$$

for coil 22, $$\frac{400}{934} \times 30 = 12.9 \text{ ampere turns}$$

and for coil 23, $$\frac{79}{934} \times 30 = 2.5 \text{ ampere turns}$$

The coils have an equal number of turns in this case and let it be assumed that there are 250 turns per coil. Then the maximum currents for the three coils are the ampere turns per coil divided by 250. Hence the maximum current for coil 21 = .0584 ampere, for coil 22 .0516 ampere, and for coil 23 .010 ampere. These are the currents that flow in the three coils with the tanks full and the instrument 4 reading full scale, or approximately full scale, corresponding to 934 gallons. It is desirable to obtain a linear relation between current variation and gallons at each transmitter as the floats follow the liquid level in the tanks. Also this relation must be the same for each transmitter so that the increment of flux per gallon is constant for each tank. The ideal relation for the example given is represented in the full line curves of Fig. 3. The theoretically correct ampere-gallons curves for the transmitters in tanks 1, 2 and 3 are shown in full lines plotted to the same scale and added together to make the composite or summation ampere-gallons curve of the complete system. It is noted that the three individual transmitter curves are straight lines and of the same slope; hence, they can be added together in any relation and form the single straight full line totalizing curve. If all of the transmitters have these characteristics then regardless of the order in which the tanks are filled or emptied the summation instrument 4, Fig. 2, can be calibrated to correctly indicate the total liquid content of the tanks. It is readily seen that if the individual curves were not substantially straight, or if they were of appreciably different slope, the totalizing instrument of the construction assumed could not be calibrated to correctly indicate the total liquid content except for one order of filling the tanks and the emptying of them in the reverse order.

Considering the transmitters let it first be assumed that the variable resistance elements 13 and 15 and 16 are uniform such that the resistance change for a given angular adjustment of the arms 12 is the same at all parts of such resistances. Such resistance elements are of low cost and are standard equipment for single tank systems and hence their use is desirable if that is possible.

As a preliminary to obtaining linear relations between gallons and transmitter currents, it may be helpful to plot the curves of depth of liquid versus gallons for the different tank sections measured by the three transmitters. From the measurements of the tanks the data for this may be readily calculated. A curve of this nature for the lower portion of tank 3 is shown in Fig. 4. While this data is not used directly in the problem the curves are helpful as a guide in selecting transmitter dimensions and transmitter positions in the tanks likely to prove satisfactory. In general the nearer we can come to obtaining a linear relation between the angular motion of the transmitter and the gallons measured thereby the simpler the final calibration. Thus, inspecting the curve of Fig. 4 it is seen that we desire a transmitter such if used in a tank of uniform capacity at all levels it would produce a curve of angular movement to gallons of opposite curvature to that shown in Fig. 4 so that when used in the lower portion of tank 3 it produces an angular movement to gallons curve which will approach more closely to a straight line. Thus, if we place a transmitter of the kind described with the float pivot near to the bottom of the tank 3 as represented in Fig. 1 and have the arm of the float of the proper length its angular movement-gallons curve will approximate a straight line. This is because as the float arm moves upward over its range of movement it turns through a greater angle near the top than near the bottom for equal increments of elevation.

Consider tank 1 and suppose that instead of installing the float transmitter as indicated in Fig. 1 we install a transmitter higher up as shown in Fig. 5 which produces an angular deflection-gallons curve as shown in Fig. 6 which is too far from a straight line to give desired results. Using a slightly longer float arm and lowering the pivot joint in the tank as indicated in Fig. 1 the curve of angular deflection to gallons is materially improved as represented in Fig. 7. Having in this manner obtained approximately straight line angular deflection-gallons curves for the three transmitters we now are ready to calculate and proportion the circuit resistances as to obtain the correct maximum instrument coil currents and so that the transmitter current-gallons curves will not only be substantially straight but also of the same slope. In this connection it is evident that if transmitter resistance-gallons curves were drawn they would be similar to the angular deflection-gallons curves since uniform resistance transmitters have been assumed.

In conformity with practicable considerations and existing practice for single unit liquid level telemetering systems now used on aeroplanes, I will assume a 28.5 voltage direct current source of supply, a transmitter resistance of 270 ohms, and a coil resistance of 300 ohms. The equivalent resistance circuit for tank 1, transmitter 13, and its corresponding instrument coil 21 and resistance 32 is represented in Fig. 8 where $R_{31}$ and $R_{32}$ represents the run of the coil resistance and resistance 32. $R_{13}$ represents the total transmitter resistance, and $R_{27}$ represents the resistance connection to ground from the right-hand end of transmitter resistance $R_{13}$. We previously specified an instrument requiring a maximum current of .0584 ampere in coil 21 when the No. 1 tank is full and brush arm 12 is to the right of the 270 ohm transmitter resistance. Under the conditions assumed $R_{27}$ or 27, Fig. 2, is calculated to be 88 ohms as follows. The voltage drop across the coil circuit resistance $$R_{21}+R_{32}=300\times.0584=17.5 \text{ volts}$$

and obviously this is also the voltage drop across transmitter resistance $R_{13}$. The voltage across $R_{27}=28.5-17.5=11$ volts. The current flow through $$R_{13}=\frac{17.5}{270}=.0649 \text{ amperes}$$

The current flow through resistance $$R_{27}=.0584+.0649=.1253 \text{ ampere}$$

Then $$R_{27}=\frac{11}{.1253}=88 \text{ ohms}$$

The connections to the extremities of resistance $R_{13}$ are preferably initially adjustable for minor empty and full tank limit adjustments and are made before calibration as above described. Instrument current values for different positions of the transmitter brush 12 along the resistance $R_{13}$ may now be calculated or measured. In the example given the current value in coil 23 for different percentages of total angular brush movement where 100% is with the tank full are as follows:

| Percent angular movement or transmitter ohms | Coil current |
|---|---|
| 0 | 0 |
| 25 | 0.0151 |
| 50 | .0279 |
| 75 | .0419 |
| 100 | .0584 |

The resulting current-gallons curve using the transmitter which gives the angular movement-gallons curve of Fig. 7 is shown in dotted lines superimposed on the theoretically correct curve for tank 1 in Fig. 3. This and the current-gallons curves of the other transmitters derived in a similar manner are sufficiently accurate for the purpose. Without going through the calculations of resistance values that may be used for the other tank transmitters to produce substantially straight line current-gallons curves of the same slope are as follows: For the transmitter in tank 2, instrument coil circuit 306 ohms, transmitter resistance 306 ohms and resistance 28, 123 ohms. For the transmitter in tank 3 instrument coil circuit 1200 ohms, transmitter resistance 1590 ohms, and resistance 29, 940 ohms. The additional resistance in the instrument coil circuits are represented in Fig. 1 at 30, 31, and 32. These values produce the current-gallons curves shown in dotted lines superimposed on the theoretically correct corresponding curves of Fig. 3.

A further shaping of such curves may be had by using different sized wire or a different number of turns in the instrument coils 21, 22 and 23. For instance, using the transmitter as shown in tank 1, Fig. 1, which produces the angular movement-gallons curve of Fig. 7 the current-gallons curves of Fig. 9 may be produced. Curve 1 of Fig. 9 results from a coil circuit resistance of 200 ohms, a transmitter resistance of 270 ohms and a resistance at 27 of 165 ohms. Curve 2 of Fig. 9 results from a coil circuit resistance of 150 ohms, a transmitter resistance of 590 ohms, and a resistance at 27 of 270 ohms, Fig. 9, is included merely to show this additional way of how the shape of current-gallons curves may be modified and could be applied where the shape of the tank and the angular movement-gallons curve is such as to make it necessary for straightening the current-gallons curve.

It is of course possible to also graduate the resistance of the transmitters such that the angular movement-current curve of any transmitter will be a straight line and of a desired slope. An example of such a transmitter resistance is represented in Fig. 10. Here the transmitter resistor is wound with a uniform resistance wire. The insulator form on which it is wound is a section of a cylinder with its top cut by a plane so as to provide a level contact surface for the contact arm 12. The lower edge of the form, however, is given any desired curved shape so that with a uniform angular movement of the contact arm the transmitter resistance will vary non-uniformly in any desired manner calculated or determined in advance and depending upon the conditions to be met in a particular summation measurement problem of the type contemplated. Where summation systems are to be provided for a large number of aeroplanes all having a similar tank arrangement or where high accuracy is desired with a particularly difficult tank arrangement, tank transmitters of the form shown in Fig. 10 may be used with one or more of the transmitters involved and in combination with one or more of the other expedients described to provide accurate tank summation systems. It is to be noted that the system described is inherently compensated for ordinary changes in voltage of the source of supply because all circuits are supplied from the same source and if the torque of coil 20 is changed by a change in voltage the same proportionate change in counter torque is experienced by a corresponding change in voltage on the circuits of coils 21, 22 and 23.

The actual choosing of the various resistance elements is not quite as arbitrary as has been implied. A study of the parallel combination suggests certain logical limitations to the values of the resistors. Also the matter of watts dissipation must be kept in mind in order that overheating will not occur.

For measurement purposes it is correct and convenient to refer to those portions of tanks 2 and 3 metered by the transmitter in tank 2 as one tank and that portion of tank 3 metered by the transmitter therein as another tank and in order to simplify the language used in the claims a tank may mean any unitary or combined liquid container metered by a single transmitter where such meaning is not otherwise inconsistent with the language used.

What I claim as new and desire to secure by Letters Patent of the United States, is:

1. In combination with a plurality of tanks for containing liquid, which tanks may be of different capacity, different shape, and at different levels, a system for totalizing the liquid content of such tanks comprising a float operated electric current varying transmitter in each tank, a source of supply, an electrical measuring instrument of the ratio type having a winding energized in response to the voltage of said source and a winding formed of a plurality of coils, there being a coil associated with each electrical transmitter energized from said source in response to the current variation produced by such corresponding transmitter, said instrument measuring the ratio of ampere turns in the two windings, each of said float operated electrical transmitters producing a current variation in its respective instrument coil which varies in proportion to the gallons of liquid contained in the corresponding tank, the proportionality relation between such current variation and tank gallons being similar and substantially linear for all tanks and the current in each coil being a minimum when its corresponding tank is empty.

2. In combination with a plurality of tanks of different liquid content capacity, a system of totalizing the liquid content of such tanks comprising a float operated electric current varying transmitter in each tank, a source of electric supply, an electrical measuring instrument of the ratio type having a winding energized in response to the voltage of said source, and a winding formed by a plurality of similar coils, there being a coil associated with each electrical transmitter and energized from said source in response to current variations produced by such corresponding transmitter in direct proportion to varying amounts of liquid in the corresponding tank, said instrument measuring the ratio of the ampere turns in the two windings and producing an indication in terms of the total liquid content of said tanks, the maximum currents carried by the several coils being in the same relation as the maximum liquid content capacity of the respective individual tanks with which they are associated through the transmitters, all of said transmitters having substantially a linear relation between the tank capacity as measured by its float and the current transmitted to the instrument thereby, and all of the transmitted currents being substantially equal for equal liquid content tank measurements.

3. In combination with a plurality of liquid tanks of different size and shape, at least one of which has a liquid capacity which varies with the depth of liquid therein in other than a linear relation, liquid level current transmitters in each tank, each comprising a pivoted lever operated by a float and a resistance which is varied in response to the angular position of such float arm, a source of supply, an electrical measuring instrument supplied from said source by currents varied by said resistances for producing an indication of the summation of the liquid content of all of said tanks, said instrument having different energizing circuits for the different transmitters, and other resistance means associated with said circuits for calibrating purposes, the lengths of the float arms, the elevation of their pivot points in their respective tanks and the calibrating resistance means all being selected and adjusted in relation to the response characteristics of said instrument to provide an instrument indication representative of the total liquid content of all of such tanks which is at all times independent of the order in which the tanks may be filled with or emptied of liquid.

JOHN R. MACINTYRE.